United States Patent
Rabaioli

(10) Patent No.: US 7,130,857 B2
(45) Date of Patent: Oct. 31, 2006

(54) METHOD FOR ACCESSING A MEMORY UNIT IN WHICH SEQUENCES OF NOTES ARE STORED, CORRESPONDING MEMORY UNIT AND CORRESPONDING PROGRAM

(75) Inventor: Giovanni Rabaioli, Höhenkirchen-Siegertsbrunn (DE)

(73) Assignee: Siemens Aktiengesellschaft, Munich (DE)

(*) Notice: Subject to any disclaimer, the term of this patent is extended or adjusted under 35 U.S.C. 154(b) by 516 days.

(21) Appl. No.: 10/381,907

(22) PCT Filed: Sep. 11, 2001

(86) PCT No.: PCT/DE01/03493
§ 371 (c)(1), (2), (4) Date: Mar. 31, 2003

(87) PCT Pub. No.: WO02/27467
PCT Pub. Date: Apr. 4, 2002

(65) Prior Publication Data
US 2004/0047357 A1    Mar. 11, 2004

(30) Foreign Application Priority Data
Sep. 29, 2000 (DE) .............................. 100 48 479

(51) Int. Cl.
G06F 7/00 (2006.01)
G06F 12/00 (2006.01)
(52) U.S. Cl. .................. 707/101; 711/100; 711/109
(58) Field of Classification Search ............... 707/1, 707/101; 711/100, 109
See application file for complete search history.

(56) References Cited

U.S. PATENT DOCUMENTS

| 5,692,176 A | 11/1997 | Holt et al. |
| 5,907,297 A | 5/1999 | Cohen et al. |
| 5,963,935 A | 10/1999 | Ozbutun et al. |
| 6,141,656 A | 10/2000 | Ozbutun et al. |

OTHER PUBLICATIONS

Mano M., Computer System Architecture, 3rd Edition, Prentice-Hall, Inc., pp. 4, 5, 58, 60, 61, 213-215, 219, 220, 223-225, and 472-475, 1993.*

* cited by examiner

Primary Examiner—Tim Vo
Assistant Examiner—Cheyne Ly
(74) Attorney, Agent, or Firm—Staas & Halsey LLP

(57) ABSTRACT

A method employs a bit sequence having a plurality of successive bits is stored in a write mode in a memory unit for a data value of a datum. The bit positions are each allocated to a data set which contains a data field for storing the datum. This measure enables logic operations to be carried out very rapidly.

24 Claims, 5 Drawing Sheets

FIG 5
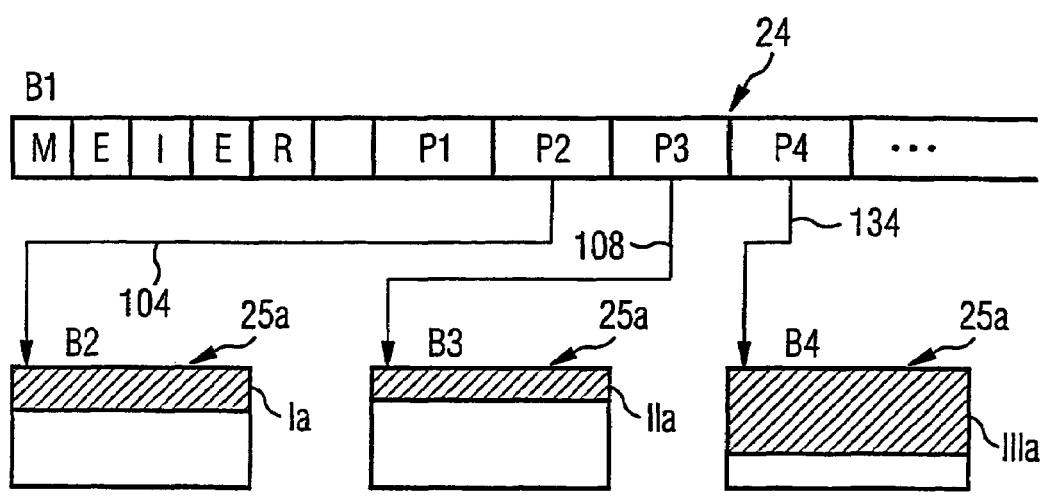
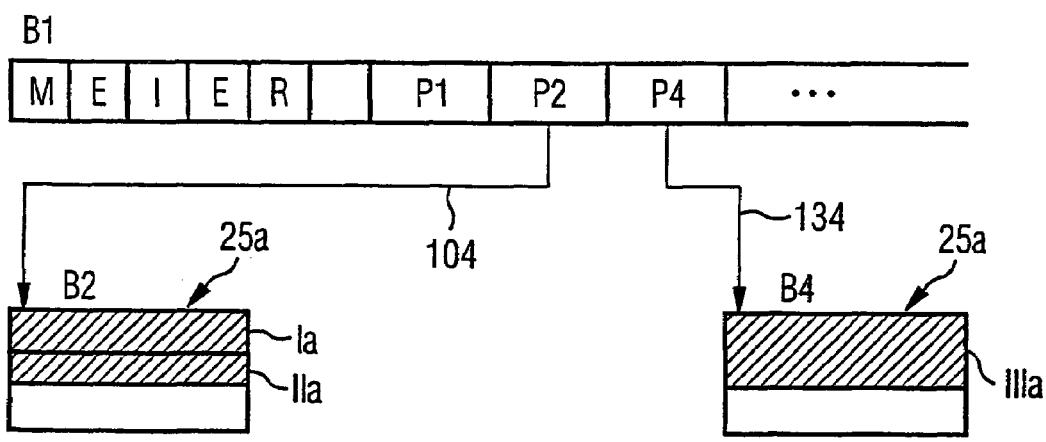

METHOD FOR ACCESSING A MEMORY UNIT IN WHICH SEQUENCES OF NOTES ARE STORED, CORRESPONDING MEMORY UNIT AND CORRESPONDING PROGRAM

CROSS REFERENCE TO RELATED APPLICATIONS

This application is based on and hereby claims priority to PCT Application No. PCT/DE01/03493 filed on 11 Sep. 2001 and German Application No. 100 48 479.4 filed on 29 Sep. 2000.

BACKGROUND OF THE INVENTION

The invention relates to a method in which a sequence of notes for data sets is stored in a write mode in a memory unit for a data value of a datum. At least a part of the sequence of notes is read and processed in a read mode in order to identify certain data sets.

The sequence of notes is referred to as a search list in one known computer-aided search method. The datum is, for example, the surname of a person. The value of the datum is, for example, the surname "Meier". The sequence of notes for the data value "Meier" then contains notes of data sets for persons having the surname "Meier". The individual data sets usually also contain other data fields, for example the first name and a telephone number in addition to the surname. Inverted search lists or inverted sequences of notes that are stored for another datum, for example for certain first names, are used in order to simplify the search for the data in the other data fields.

It is known to store the number of a dataset as a note. A data set can be identified by the number with the aid of a database system because the number of the data set concerned is also stored in a data field of each data set. Other known methods calculate from the number noted in the sequence of notes a memory address at which the relevant data set is stored. The number itself does not have to be stored in a data field of the data set in this case. Methods are also known, however, in which the notes are memory addresses at which the data sets are to be found. The known methods have the disadvantage that a large memory area is required to store the sequence of notes. If, for example, there are several thousand data sets, more than 16 bits are required in each case to note the numbers. Usually 32 bits are chosen, as this option corresponds to the data word width of known processors. Depending on the size of the memory, it is often necessary to use several data words of 32 bits each to store memory addresses.

The linking of two sequences of notes with the aid of logic operations is complex, as only two numbers or two addresses can be linked with each other with each logic operation. This makes the linking of very long lists in particular most demanding of processor time.

Additional advantages, aspects, and features of the invention will be set forth in part in the description which follows and in part will become apparent to those having ordinary skill in the art upon examination of the following or may be learned from practice of the invention. The aspects and advantages of the invention may be realized and attained as particularly pointed out in the appended claims.

SUMMARY OF THE INVENTION

According to an aspect of the present invention, there is provided a simple method for accessing a memory unit in which a sequence of notes is stored, which method makes it possible, in particular, to process the sequence of notes rapidly. A corresponding memory unit and a corresponding program are also to be specified.

The invention is based on the recognition that it is possible to note a data set with just a single bit. Each data set must be allocated precisely one bit position in a bit sequence for this purpose. A procedure of this type first of all yields immediate advantages when linking two sequences of notes or when processing a sequence of notes with a logic operation. It is indeed possible to link or process 32 notes with a logic operation or processing operation given a data word width of 32 bits. This is 32 times the current usual linking speed with the same processor.

The invention is also based on the recognition that the allocation of each data set to a different bit position, especially if there are a large number of data sets, only appears to be associated with significantly higher memory complexity. It could be assumed, for example, that given one million data sets, a sequence of notes of one million bits would have to be stored if only the last data set was to be noted. This can be avoided, however, with a compression method for the bit sequence.

Memory space can be saved in any case in comparison with known sequences of notes even without compression if a very large number, relative to the total number of data sets, of data sets in the sequence of notes are noted. If, for example, a data word of 32 bits is required in a known method for noting a data set used here for the purposes of comparison, less memory space will be required for the bit sequence in accordance with the method according to the invention if more than 1/32 of the total number of data sets in the sequence of notes have to be noted. A known method could also be used in such cases with sequences of notes having very few entries. The use of the method according to the invention even without compression makes it possible in other cases to link or process the sequences of notes rapidly and leads to a considerable saving of memory space. Adding compression increases the saving in memory space already achieved by further orders of magnitude.

This is why in the method according to the present invention a bit sequence including a plurality of successive bits is stored in a write mode in a memory unit for a data value of a datum. Each of the bits has one of two bit values, for example the value logic 0 or logic 1.

A data set containing a data field for storing the datum is allocated to each of some of the bit positions or all of the bit positions. The one bit value in the bit sequence, for example the bit value logic 1, notes that the data set allocated to the bit position with this bit value contains the data value in the data field for storing the datum. The other bit value, for example the bit value logic 0, in the bit sequence notes that the data set allocated to the bit position with this bit value does not contain the data value in the data field for storing the datum.

It can happen over the course of time that certain data sets of the bit sequence are declared invalid. If this is the case, only a part or a large part of the bit positions are allocated a data set in each case. Bit positions to which no data sets are allocated are detected when accessing the data sets, for example, by the lack of associated data.

The method according to the invention is executed as early as when writing the bit sequence, as this puts in place the necessary conditions for a later read mode. Use is also made of the method according to the invention, however, when at least a part of the bit sequence is read in a read mode. The technical effects mentioned above also come into play here: it is possible, in particular, to link the bit sequence very rapidly and considerably less memory space is required in many cases to store the bit sequence than if known sequences of notes are used.

The bit sequence in a development contains more bit positions than are contained in a data word of a processor accessing the memory unit. The bit sequence thus extends over multiple data words. The order of the bit sequence can be easily ensured in linearly addressable memory units in particular if, for example, data words with successive sections of the bit sequence are also allocated to successive memory addresses. Bit sequences are used that have several thousand bit positions, to which several thousand data sets are allocated. The method according to the invention can, however, also be used with a very large number of data sets, this number possibly being well over a million data sets.

A next development provides for a processor to link two bit sequences according to a logic operation. Double entries can be managed easily using the OR function because the result bit sequence contains only one note for such entries. When linking, the processor links bit positions that are allocated to the same data sets. A development provides for as many bit positions as there are in one data word of the processor to be processed simultaneously, that is to say, for example, several bytes of eight bits each.

The linking method in accordance with the last-mentioned development is suitable for simultaneous execution. One arrangement thus provides for two bit sequences to be linked simultaneously by at least two processors according to a logic operation. The bit sequences are distributed to the processors before or during processing. The result bit sequences are recombined. Each processor receives sections of both bit sequences that are allocated to the same data sets. It is, however, also possible to process one bit sequence with at least two processors according to a logic operation, for example according to the NOT operation. The bit sequence is divided into two or more bit sequences prior to processing. The processors then simultaneously process the sections of the bit sequence allocated to them in each case.

Another development provides for the bit sequence to be compressed using a compression method. One arrangement provides for successive data words in which just one bit value occurs, for example the bit value 0, to be replaced by two number values. The first number value indicates the number of data words replaced. The second number value indicates the number of succeeding and compressed data words. Compression factors of 0.1 and smaller can be obtained using a simple compression method such as this. Other compression methods are also used, however, for example a run length coding as is known from image processing.

A next development provides for the bit position in the bit sequence to designate the number of the allocated data set. Accordingly the first bit position is allocated the data set having the number 1, the second bit position immediately to the right of this first bit position is allocated the data set having the number 2, etc. The number can be noted in the data set in order to enable the data set to be found in particular in the case of data sets that are stored unsorted. Alternatively, however, the memory address of the allocated data set can also be calculated from the number using a method that is the same for the data sets. The data set no longer needs to contain the number in this case.

A development provides for the bit sequence to be stored in several memory areas of the same size. Such memory areas are allocated mandatorily by a database system, for example. The size of the memory areas thus amounts to 32 kilobytes when using the ISAM (Index Sequential Access Method) data management system, which is, for example, a component of the POSIX (Portable Operating System Interface for Unix) interface of the UNIX (Uniplexed Information and Computing System) operating system. A sequence of references with references to the memory areas defines the order in which the bit sequence is stored in the memory areas. The use of multiple memory areas, however, also avoids complex re-storing procedures, especially if a compression method is being used, if the length of the bit sequence changes as a result of the insertion and modification of bit values. There is no need constantly to relocate data across the boundaries of memory areas.

One arrangement provides for the utilization of the memory areas to be monitored. The utilization of other memory areas is also changed in the event of measures to incorporate a new memory area or to release a memory area. The monitoring makes it possible to combine adjacent memory areas with a low level of utilization at an early stage, that is to say before the last utilized byte or data word of a memory area becomes superfluous. The full utilization of a memory area is also detected. If a memory area is found to be full, a new memory area has to be enlisted to store the bit sequence.

One arrangement provides, when incorporating a new memory area to store a part of the bit sequence, for a part of the bit sequence to be moved into the new memory area from another memory area. The size of the part can be set such that more than one third of the memory area is required in order to store it. A new reference relating to the new memory area is inserted into the sequence of references or appended to the sequence of references. This measure ensures that the previous memory area does not become fully utilized again too quickly and postpones the insertion of a further new memory area.

A next arrangement provides for a check to be made as to whether less than one third of a memory area is utilized by the part of the bit sequence stored in it. A check is additionally made as to whether the memory area entered before and/or after this memory area in the sequence of references has sufficient space to accommodate the part of the bit sequence. Sufficient space is available, for example, if, after the bit sequence has been transferred, at least one third of the memory area entered before and/or after the memory area to be emptied still remains free. If there is sufficient space available, the part of the bit sequence is transferred. The references in the sequence of references are updated and the reference to the memory area emptied is removed. This memory area may subsequently be used again to store other parts of the bit sequence.

The invention additionally relates to a memory unit in which at least one bit sequence and the corresponding data sets are stored. Also forming part of the object of the invention is a memory unit that contains memory cells with data that is required to execute the method according to the invention and the developments thereof. The technical effects specified above thus also apply in respect of the memory unit according to the invention and the developments thereof.

The invention furthermore protects a program, the execution of which by a processor executes the method according to the invention or one of the developments thereof. The technical effects mentioned above thus also apply in respect of the program.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5 shows the release of a memory area used to store a part of the bit sequence.

DETAILED DESCRIPTION OF THE PREFERRED EMBODIMENT

Figure 1:
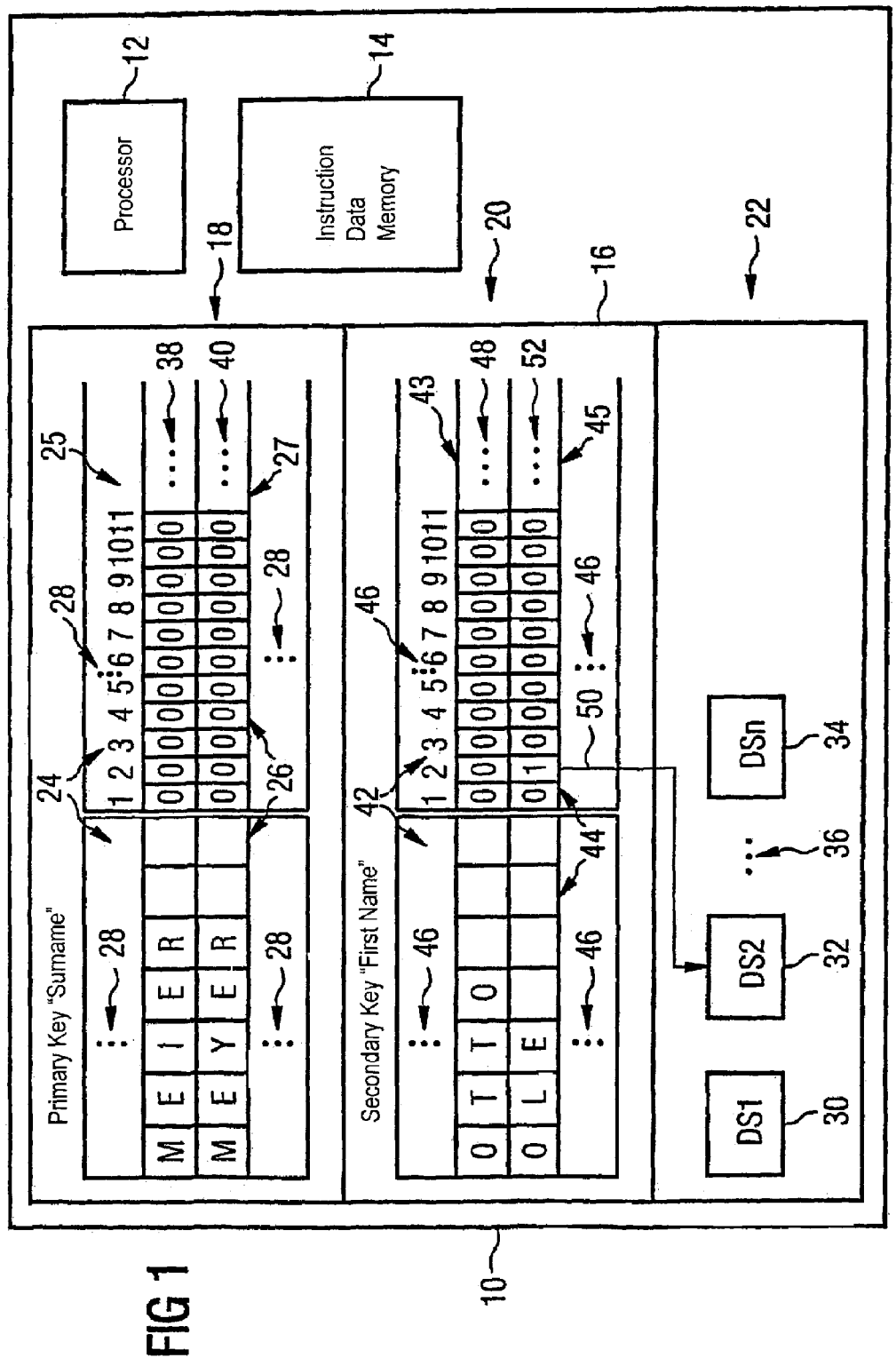
FIG. 1 shows a data processing system having a memory unit for storing bit sequences.

Reference will now be made in detail to the various aspects of the present invention, examples of which are illustrated in the accompanying drawings, wherein like reference numerals refer to like elements throughout.

FIG. 1 shows a data processing system 10 having a processor 12, an instruction data memory 14 and a memory unit 16. The processor 12 is, for example, a processor of the 80×86 series from the Intel company. The processing width of the processor 12 determines the number of bit positions in one data word and in one half-word. One data word, for example, contains 32 bits and one half-word 16 bits. The processor 12 executes instructions that are stored in the instruction data memory 14 in order to execute the methods explained below. The memory unit 16 is a mass data memory, for example a magnetic disk having several gigabytes of memory space. It is also possible to employ a RAM (random access memory) or ROM (read only memory), for example, as memory unit 16.

The memory unit 16 contains three memory areas 18 to 22, which serve in this order to store search lists, to store inverted search lists and to store data sets. Two search lists 24 and 26 are shown in the memory area 18 in FIG. 1. Further search lists 28 are indicated by dots. The search lists 24 to 28 stored in the memory area 18 belong to a primary key with the attribute "Surname". The search list 24 was created for the primary key value "MEIER". The search list 24 contains a bit sequence 25 in which each bit position is allocated to a data set. The bit position 1 of the bit sequence 25 is allocated to a first data set 30. The bit position 2 of the bit sequence 25 is allocated to a second data set 32, etc. The last bit position n of the bit sequence 25 is allocated to a data set 34. Data sets 36 lying between the data sets 32 and 34 are indicated by dots. The bit positions 1 to 11 of bit sequence 25 shown in FIG. 1 have the value 0 because the first eleven data sets do not belong to persons having the surname "Meier". Further bit positions 38 of the bit sequence 25 are indicated by dots. There are among the bit positions 38 not shown also bit positions having the value 1. These bit positions are allocated to data sets that belong to persons whose surname is "Meier".

The search list 26 arranged after search list 24 in alphabetical order was created for the name "MEYER". The search list 26 also contains a bit sequence 27 with bit positions to each of which a data set is allocated in the same way as with the bit positions of bit sequence 25. Shown in FIG. 1 are bit positions 1 to 11 of bit sequence 27, all of which have the value logic 0. The bit positions having the value 0 refer to data sets 30 to 34 in which a surname other than the surname "Meyer" is stored. Further bit positions 40 of the bit sequence 27 are indicated by dots. Some of the bit positions among the further bit positions 40 have the value 1. These bit positions refer to data sets that belong to persons having the surname "Meyer". The bit positions having the value 0, on the other hand, refer to data sets 30 to 34, in which a surname other than the surname "Meyer" is stored.

Two inverted search lists 42 and 44 are stored in the memory area 20. Further inverted search lists 46 are indicated by dots. The inverted search list 42 was created for the secondary key "First name" with the value "OTTO". Stored along with the key value in the inverted search list 42 is a bit sequence 43, the bit positions of which are allocated to the data sets 30 to 34 in the same way as the bit positions of the bit sequence 25. Shown in FIG. 1 are bit positions 1 to 11 of the bit sequence 43, which all have the value 0. Further bit positions 48 of the bit sequence 43 are indicated by dots.

The inverted search list 44 is arranged after the inverted search list 42 in alphabetical order. The inverted search list 44 was created for the first name "OLE" and contains in addition to this first name a bit sequence 45, the bit positions 1 to 11 of which are shown in FIG. 1. The bit position 1 of the bit sequence 45 is allocated to the data set 30. The value 0 at bit position 1 indicates that a first name other than the first name "Ole" is stored in the data set 30. The bit position 2 of the bit sequence 45 has the value 1. This means that the second data set 32 contains the first name "Ole", see arrow 50. The bit positions 3 to 11 of the bit sequence 45 have the value 0. Further bit positions 52 of the bit sequence 45 are indicated by dots.

Figure 2:
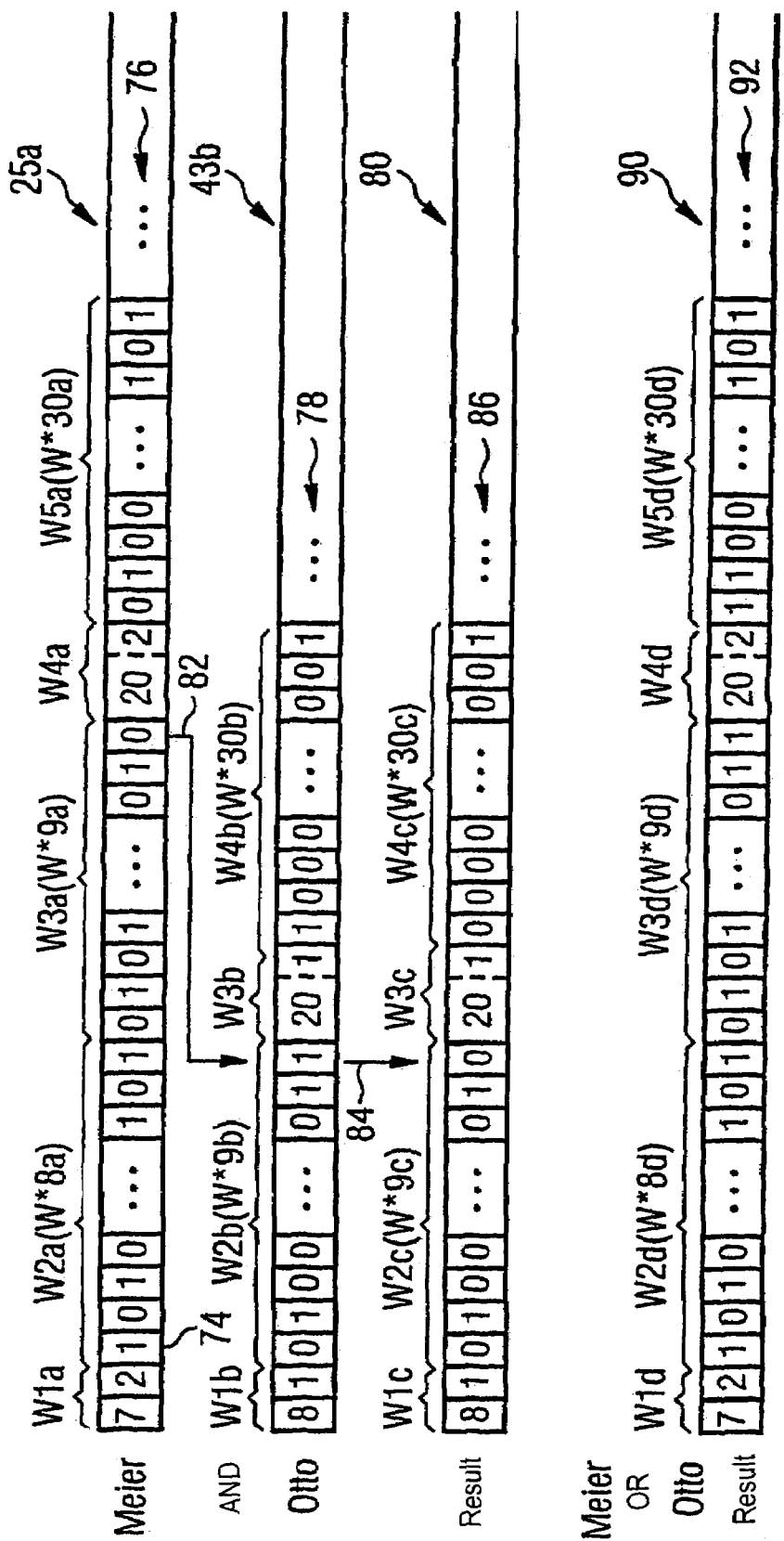
FIG. 2 shows compressed bit sequences for logic operations.

FIG. 2 shows compressed bit sequences 25$a$ and 43$b$ respectively created from the bit sequence 25 of the search list 24 and from the bit sequence 43 of the inverted search list 42. The compressed bit sequence 25$a$ is therefore allocated to the surname "Meier". A first data word W1$a$ of the bit sequence 25$a$ contains two number values. The number values can also be stored in a different way, for example each in one data word. Each bit sequence starts with two number values even if the bit sequence begins with 1. The first number value in this case is 0.

A number value "7" in the left half-word of the data word W1$a$ indicates that the uncompressed bit sequence 25 initially contains seven data words W*1$a$ to W*7$a$ in uncompressed form, the bit positions of which all have the value 0. The "*" points at the uncompressed form of the bit sequence. The number value "2" in the right half-word of the data word W1$a$ indicates that the data word W1$a$ is followed by two data words W2$a$ and W3$a$ that contain uncompressed parts of the bit sequence 25$a$. Each of the data words with uncompressed parts contains 32 bit positions, of which the first four bit positions and the three final bit positions are shown in each case in FIG. 2. Intermediate bit positions are indicated by dots. The second data word W2$a$ of the compressed bit sequence 25$a$ forms the eighth data word W*8$a$ of the uncompressed bit sequence 25. The first bit position 74 of the data word W2$a$ belongs to the 225$^{th}$ data set and has the value 1, so the 225$^{th}$ data set contains the surname "Meier". The data word W2$a$ begins with the bit sequence "1010" and ends with the bit sequence "101". The third data word W3$a$ of the compressed bit sequence 25$a$ corresponds to the ninth data word W*9$a$ of the uncompressed bit sequence 25 and contains the start bit sequence "0101" and the end bit sequence "010". A further two number values are noted in the next data word W4$a$ of the compressed bit sequence 25$a$. The value "20" in the first half-word of the data word W4$a$ indicates that twenty data words follow in the uncompressed bit sequence 25, the bit positions of all of which have the value 0. The value "2" in the right half-word of the data word W4a indicates that two further data words W5a and W6a, in which bit sequences of the uncompressed bit sequence 25 are stored, follow in the compressed bit sequence 25a. The fifth data word W5a of the compressed bit sequence 25a corresponds to the $30^{th}$ data word W*30a of the uncompressed bit sequence 25. The data word W5a contains the start bit sequence "0100" and the end bit sequence "101". Further data words 76 of the bit sequence 25a are indicated by dots.

The compressed bit sequence 43b begins with a data word W1b in which two number values are stored. The value "8" in the left half-word of the data word W1b indicates that the uncompressed bit sequence 43 begins with eight data words, all of the bit positions of which have the value 0. The value "1" in the right half-word of the data word W1b indicates that there follows in the compressed bit sequence 43b a data word W2b that contains an uncompressed data word of the bit sequence 43. The second data word W2b of the compressed bit sequence 43b corresponds to the ninth data word W*9b of the uncompressed bit sequence 43. The left half-word of the following data word W3b of the compressed bit sequence 43b contains the number value "20", which indicates that twenty data words whose bit positions have the value 0 follow in the uncompressed bit sequence 43. The right half-word of the data word W3b contains the value "1", which indicates that the data word W3b is followed in the compressed bit sequence 43b by a data word W4b, in which are stored bit positions of the uncompressed bit sequence 43. The fourth data word W4b of the compressed bit sequence 43b corresponds to the $30^{th}$ data word W*30b of the uncompressed bit sequence 43. The data word W4b contains the start bit sequence "1000" and the end bit sequence "001". Further data words 78 of the bit sequence 43b are indicated by dots.

A compressed result bit sequence 80 is generated as the processor 12 executes a logic program stored in the instruction data memory 14, see FIG. 1. The bit sequences 25a and 43b are passed to the logic program as input. It is additionally determined using a parameter that a bitwise AND operation is to be executed for the bit positions of both bit sequences. It is determined when calculating the result bit sequence 80 that the uncompressed bit sequence 25 contains at its start eight data words whose bit positions have the value 0. A data word W1c of the compressed result bit sequence 80 is thus determined independently of the values of the first eight data words of the uncompressed bit sequence 43. The larger number value from the first number values in the data words W1a and W1b and the smaller number value from the second number values in the data words W1a and W1b are in the process taken over into the data word W1c. The data word W1c thus contains the number value "8" in its left half-word and the number value "1" in its right half-word. The data word W1c thus corresponds to the data word W1b. The first eight data words of the bit sequences 70 and 72 are thus already linked. The data word W3a is linked bitwise with the data word W2b in a next method operation. This is done with the aid of a single AND instruction for the processor 12. The processor 12 in response to this instruction generates a second data word W2c of the compressed result bit sequence 80 corresponding to the ninth data word W*9c of the uncompressed result bit sequence. The data word W2c has the start bit sequence "0100" and the end bit sequence "010". The "0" of the data word W3a is, for example, linked with the "1" in the final position of the data word W2b for the final bit position. The logic result is "0" and is stored in the final bit position of the data word W2c, see arrows 82 and 84.

The next operation is to process the data words W4a and W3b. A third data word W3c of the compressed result bit sequence 80 is generated, the left half-word of which contains the number value "20" and the right half-word of which contains the number value "1". The data words W5a and W4b are then linked bitwise in an instruction cycle with the aid of the AND instruction of the processor 12. The data word W4c, which contains the start bit sequence "0000" and the end bit sequence "001", is created. The data word W4c of the compressed result bit sequence 80 corresponds to the $30^{th}$ data word W*30c of the uncompressed result bit sequence. Further data words 86 of the result bit sequence 80 are indicated by dots.

A compressed result bit sequence 90, which is the result of a bitwise OR operation for the bit sequences 25a and 43b, is shown in the lower part of FIG. 2. The linking is started with the processing of the data words W1a and W1b. The first number value "7" of the data word W1a, which is smaller than the first number value of the data word W1b, is taken over into the first result data word W1d as a result of the regularities applying to the OR operation. The number value "2" from the right half-word of the data word W1a is larger than the number value "1" in the right half-word of the data word W1b and is therefore taken over into the right half-word of the data word W1d. The bit values of the data word W2a are then taken over as bit values of the second data word W2d of the result bit sequence 90. The data word W2d of the compressed result bit sequence 90 coincides with the eighth data word W*8b of the uncompressed result bit sequence. The data word W3a is linked bitwise in a next method operation with the data word W2b according to the OR function. A third data word W3d of the result bit sequence 90 is created. The data word W3d contains the start bit sequence "0101" and the end bit sequence "011".

The value "20" is taken over, after a comparison, from the data word W4a into the first half-word of the following result data word W4d in the course of the subsequent execution of the OR operation. The number value "2" of the second half-word of the data word W4a is likewise taken over as the right half-word of the data word W4b after a comparison. The data words W5a and W4b are then linked together bitwise. The data word W5d of the compressed result bit sequence 90 is created. The data word W5d contains the start bit sequence "1100" and the end bit sequence "101". The data word W5d corresponds to the $30^{th}$ data word W*30d of the uncompressed result bit sequence. Further data words 92 of the result bit sequence 90 are indicated by dots.

Figure 3:
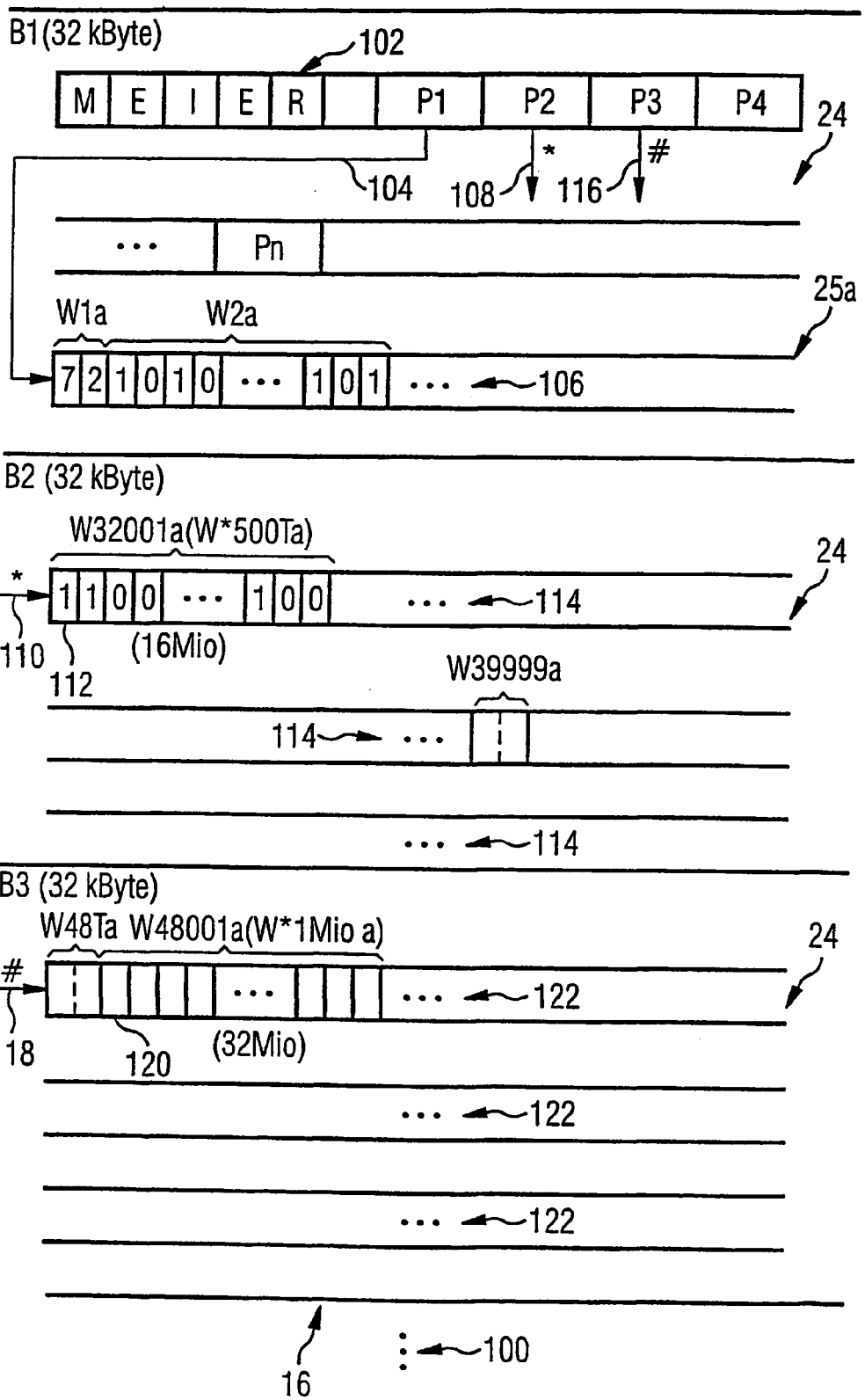
FIG. 3 shows memory areas for storing a bit sequence.

FIG. 3 shows memory areas B1, B2 and B3 for storing the search list 24. Each of the memory areas B1 to B3 has a length of 32 kilobytes. Further memory areas 100 of the same length likewise serve for storing the search list 24 and are indicated by dots. The linear address space of the memory unit 16 is shown by lines positioned one below the other in FIG. 3. The addresses of these lines increase from left to right and from top to bottom. The primary key value "MEIER" is noted at the start of the memory area B1 in a byte sequence 102 of six bytes. References P1 to Pn are stored starting with the next free address, whereby n is a natural number and specifies the number of memory areas required to store the search list 24. The references P1 to Pn are memory addresses of the memory unit 16 at which the sections of the bit sequence 25a begin in each memory area B1 to Bn. The reference P1 thus refers to an address of the memory area B1 that comes after the address for storing the last reference Pn. The bit sequence 25a begins at the address specified in the reference P1, see arrow 104. The data words W1a and W2a, already explained above with reference to FIG. 2, of the bit sequence 25a are shown in FIG. 3. Further data words 106 of the compressed bit sequence 25a are indicated by dots.

The reference P2 contains the first address or points to the first address of the memory area B2, cf. arrows 108 and 110. The 32001$^{st}$ data word W32001a of the bit sequence 25a is stored at the first address of the memory area B2. The data word W32001a corresponds to the data word W*500000a of the uncompressed bit sequence 25. Given a data word length of 32 bits, the first bit position 112 of the data word W320001a is allocated to the 16,000,000$^{th}$ data set. Further data words 114 of the part of the bit sequence 25a stored in the memory area B2 are indicated by dots. One more data word W39999a, which contains two number values, is shown in the memory area B2.

The reference P3 points to the start address of the memory area B3, see arrows 116 and 118. A data word W48000a of the compressed bit sequence 25a is stored at the start of the memory area B3. Two number values are stored in the data word W48000a. Individual bit positions of the bit sequence 25a are stored in a following data word W48001a. The first bit position 120 of the data word W48001a is allocated to the 32,000,000$^{th}$ data set. The data word W48001a corresponds to the 1,000,000$^{th}$ data word W*1000000a of the uncompressed bit sequence 25. Further data words 122 stored in the memory area B3 of the compressed bit sequence 25a are indicated by dots.

The order of the memory areas B2 to Bn in the memory unit 16 may be selected as required. All that changes in the event of a changed order are the start addresses of the memory areas B2 to Bn stored in the references P1 to Pn.

Figure 4:
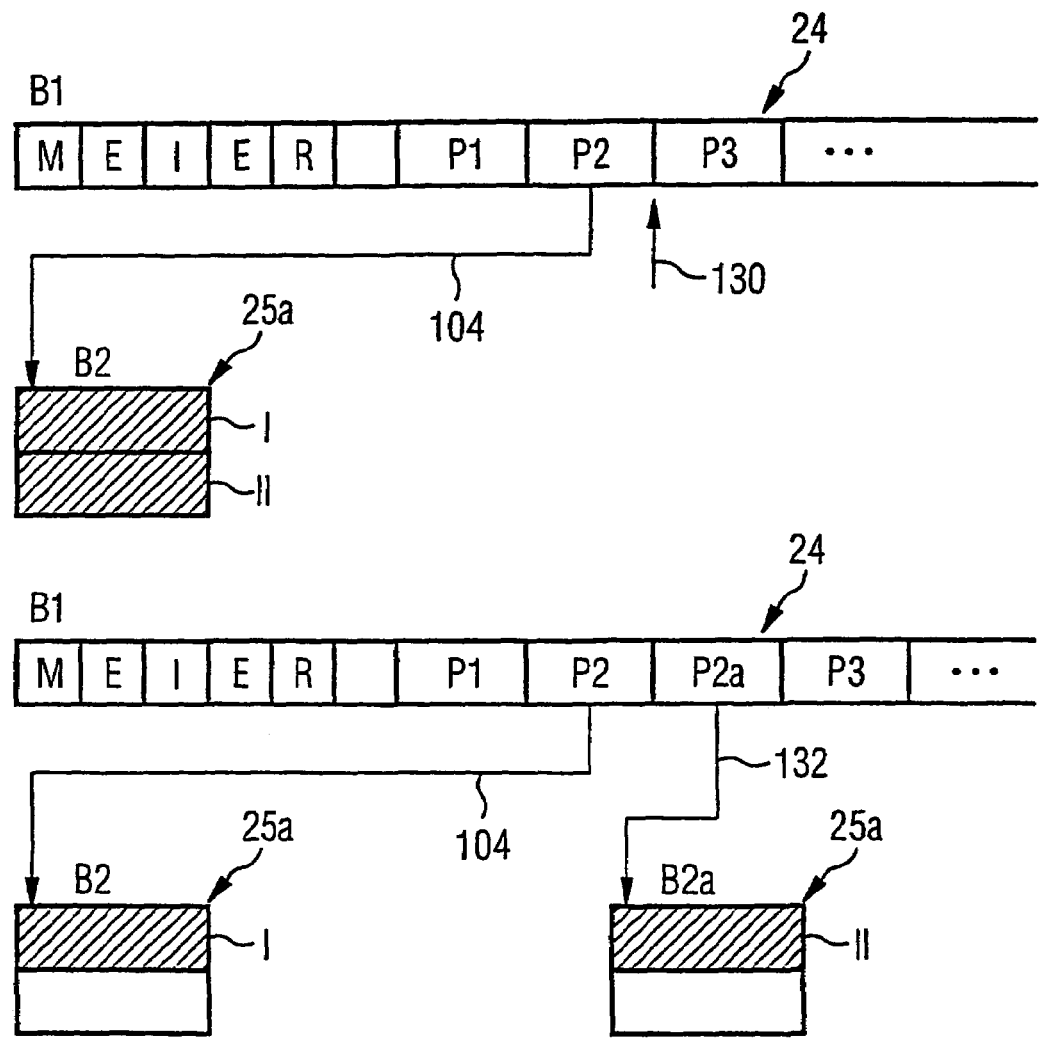
FIG. 4 shows the incorporation of a new memory area for storing a part of the bit sequence.

FIG. 4 shows the incorporation of a new memory area B2a for storing a part of the bit sequence 25a of the search list 24. Hatched lines inside the memory area B2 in the upper part of FIG. 4 indicate that the memory area B2 is fully utilized by the bit sequence 25a. The first half of the part of the bit sequence 25a stored in the memory area B2 is designated 1. The other half of the part of the bit sequence 25a stored in the memory area B2 is designated 11. A monitoring program checks that the memory area B2 is fully utilized when uncompressed sections of the bit sequence are inserted or when sections are appended at the end of the bit sequence. A new memory area B2a must therefore be used for storing the bit sequence 25a. The monitoring program inserts a new reference P2a between the references P2 and P3, see arrow 130. The start address of the memory area B2 is noted in the reference P2a, see arrow 132.

The first half I remains in the memory area B2. The second half II is copied from the memory area B2 to the start of the memory area B2a. The eventual result of this is that there are two memory areas B2 and B2a that are half utilized instead of the fully utilized memory area B2.

The method explained with reference to FIG. 4 is also executed in a further embodiment to incorporate a new memory area Bn+1 at the end of the bit sequence 25a.

FIG. 5 shows the release of a memory area B3 used for storing a part of the bit sequence 25a. A first part Ia of the bit sequence 25a is stored in the memory area B2 and utilizes approximately one third of the memory area B2. A following second part IIa of the bit sequence 25a is stored in the memory area B3, where it utilizes less than one third of the memory area B3. A third part IIIa of the bit sequence 25a is stored in the memory area B4, where it utilizes approximately two thirds of the memory area B4. The references P2, P3 and P4 refer in this order to the memory areas B2, B3 and B4, see arrows 104, 108 and 134.

The monitoring program called when the bit sequence is compressed checks that less than one third of the memory space in the memory area B3 is utilized. The monitoring program then checks to see whether there is sufficient space available in the memory areas B2 and/or B4, that is to say in the memory areas serving to store adjacent parts of the bit sequence 25a with respect to the part of the bit sequence 25a stored in the memory area B3. Sufficient space means that the sum of the first part Ia and the second part IIa yields a memory area that is smaller than two thirds of the available memory area in the memory area B2. It is, on the other hand, also possible to check whether the sum of the memory required for storage of the second part IIa and for storage of the third part IIIa similarly yields a memory requirement that is smaller than two thirds of the memory space in the memory area B4. The latter is not the case. The check of the memory area B2, however, ascertains that sufficient space is available there.

The second part Ha is therefore copied in a subsequent copying operation from the memory area B3 to the memory area B2. The memory area B3 is then released and can be used for other purposes. The reference P3 is, moreover, removed from the sequence of references.

Each of the remaining memory areas B2 and B4 is in the end up to approximately two thirds utilized with parts Ia, IIa and/or IIIa of the bit sequence 25a. When the bit sequence 25a changes as a result of new incoming data sets or changed data sets, the as yet unutilized memory space in the memory areas B2 and B4 can be used until the monitoring program has to initiate measures to incorporate a further memory area.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, and all such modifications and equivalents would fall within the scope of the invention.

The invention claimed is:

1. A method to access a memory unit, comprising:
storing in a write mode of the memory unit a bit sequence comprising successive bit positions, each bit position having one of two bit values for a data value of a datum; and
allocating at least one of the bit positions to a data set comprising a data field to store the datum, wherein
one bit value in the bit sequence indicates that at least one of the bit positions allocated to the data set with one of the bit values comprises the data value in the data field to store the datum,
the other bit value in the bit sequence indicates that the at least one of the bit positions allocated to the data set with the other of the bit values excludes the data value in the data field to store the datum,
the method further comprises compressing the bit sequence by replacing successive data words where the one bit value occurs for a first number value that with two number values where a first number value indicates a number of words replaced, and
a second number value indicates a number of succeeding uncompressed data words.

2. The method as recited in claim 1, further comprising:
reading at least a part of the bit sequence in a read mode.

3. The method as recited in claim 2, wherein the bit sequence comprises a greater number of the bit positions than bit positions in a data word of a processor accessing the memory unit, and
the bit sequence comprises several thousand, several hundred thousand or several million bit positions, to which are allocated several thousand, several hundred thousand or several million data sets.

4. The method as recited in claim 3, further comprising:
linking two bit sequences according to a first logic operation, wherein the bit positions belonging to the same data set are linked, and the bit positions in one data word are processed simultaneously.

5. The method as recited in claim 4, wherein the first logic operation comprises an OR function or an AND function.

6. The method as recited in claim 5, further comprising:
simultaneously linking two bit sequences into the bit sequence according to a second logic operation.

7. The method as recited in claim 6, wherein the second logic operation comprises a NOT function.

8. The method as recited in claim 7, further comprising:
processing a bit sequence according to a third logic operation.

9. The method as recited in claim 8, wherein the third logic operation comprises a NOT function.

10. The method as recited in claim 8, wherein
the bit position in the bit sequence designates a number of the allocated data set, where the number is noted in the data set, or a memory address of the allocated data set is calculated from the number of the allocated data sets using a method that is the same for the data sets.

11. The method as recited in claim 10, further comprising:
storing the bit sequence in memory areas of the same size, wherein
a sequence of references, with references to the memory areas, defines an order in which the bit sequence is stored in the memory areas.

12. The method as recited in claim 11, further comprising:
monitoring the utilization of the memory areas; and
changing the utilization of other memory areas to incorporate a new memory area or to release the memory area.

13. The method as recited in claim 1, wherein
the bit sequence comprises a greater number of the bit positions than bit positions in a data word of a processor accessing the memory unit, and
the bit sequence comprises several thousand, several hundred thousand or several million bit positions, to which are allocated several thousand, several hundred thousand or several million data sets.

14. The method as recited in claim 1, further comprising:
linking two bit sequences according to a logic operation, wherein the bit positions belonging to the same data set are linked, and the bit positions in one data word are processed simultaneously.

15. The method as recited in claim 14, wherein the logic operation comprises an OR function or an AND function.

16. The method as recited in claim 1, further comprising:
simultaneously linking two bit sequences into the bit sequence according to a logic operation.

17. The method as recited in claim 16, wherein the logic operation comprises a NOT function.

18. The method as recited in claim 1, further comprising:
processing a bit sequence according to a logic operation.

19. The method as recited in claim 18, wherein the logic operation comprises a NOT function.

20. The method as recited in claim 1, wherein
the bit position in the bit sequence designates a number of the allocated data set, where the number is noted in the data set, or a memory address of the allocated data set is calculated from the number of the allocated data sets using a method that is the same for the data sets.

21. The method as recited in claim 1, further comprising:
storing the bit sequence in memory areas of the same size, wherein
a sequence of references, with references to the memory areas, defines an order in which the bit sequence is stored in the memory areas.

22. The method as recited in claim 21, further comprising:
monitoring the utilization of the memory areas; and
changing the utilization of other memory areas to incorporate a new memory area or to release the memory area.

23. A method to access a memory unit, comprising:
storing in a write mode of the memory unit a bit sequence comprising successive bit positions, each bit position having one of two bit values for a data value of a datum; and
allocating at least one of the bit positions to a data set comprising a data field to store the datum, wherein
one bit value in the bit sequence indicates that at least one of the bit positions allocated to the data set with one of the bit values comprises the data value in the data field to store the datum,
the other bit value in the bit sequence indicates that the at least one of the bit positions allocated to the data set with the other of the bit values excludes the data value in the data field to store the datum,
the method further comprises storing the bit sequence in memory areas of the same size,
a sequence of references, with references to the memory areas, defines an order in which the bit sequence is stored in the memory areas,
the method further comprises monitoring the utilization of the memory areas,
the method further comprises changing the utilization of other memory areas to incorporate a new memory area or to release the memory area,
when incorporating the new memory area to store a part of the bit sequence for which more than one third of the memory area is required, the part of the bit sequence is moved into the new memory area from another memory area, and
a reference to the new memory area is inserted into the sequence of references or appended to the sequence of references.

24. A method to access a memory unit, comprising:
storing in a write mode of the memory unit a bit sequence comprising successive bit positions, each bit position having one of two bit values for a data value of a datum; and
allocating at least one of the bit positions to a data set comprising a data field to store the datum, wherein
one bit value in the bit sequence indicates that at least one of the bit positions allocated to the data set with one of the bit values comprises the data value in the data field to store the datum,
the other bit value in the bit sequence indicates that the at least one of the bit positions allocated to the data set with the other of the bit values excludes the data value in the data field to store the datum,
the method further comprises storing the bit sequence in memory areas of the same size, a sequence of references, with references to the memory areas, defines an order in which the bit sequence is stored in the memory areas, the method further comprises:

monitoring the utilization of the memory areas;

changing the utilization of other memory areas to incorporate a new memory area or to release the memory area;

checking whether less than one third of the memory area is utilized by a part of the bit sequence stored therein;

checking whether a previous or subsequent memory area to the memory area in the sequence of references has sufficient space to accommodate the part of the bit sequence;

transferring the part of the bit sequence if there is sufficient space available; and removing a reference to the memory area freed up from the sequence of references.

* * * * *